United States Patent
Scott

(10) Patent No.: US 11,582,962 B1
(45) Date of Patent: Feb. 21, 2023

(54) FISHING ROD WITH INTERIOR LINE

(71) Applicant: William R. Scott, Kissimmee, FL (US)

(72) Inventor: William R. Scott, Kissimmee, FL (US)

(*) Notice: Subject to any disclaimer, the term of this patent is extended or adjusted under 35 U.S.C. 154(b) by 25 days.

(21) Appl. No.: 16/998,274

(22) Filed: Aug. 20, 2020

(51) Int. Cl.
    *A01K 87/00* (2006.01)
    *A01K 87/04* (2006.01)
    *A01K 97/12* (2006.01)

(52) U.S. Cl.
    CPC ............ *A01K 97/12* (2013.01); *A01K 87/002* (2013.01); *A01K 87/04* (2013.01)

(58) Field of Classification Search
    CPC .... A01K 87/00; A01K 87/002; A01K 87/005; A01K 87/007; A01K 87/08; A01K 97/12
    USPC ............... 43/18.1 R, 18.1 HR, 17, 23, 25
    See application file for complete search history.

(56) References Cited

U.S. PATENT DOCUMENTS

| | | | | |
|---|---|---|---|---|
| 2,351,734 A * | 6/1944 | Backe | ............. | A01K 87/02 43/18.1 CT |
| 2,478,131 A * | 8/1949 | Rossi | ............. | A01K 87/00 43/18.1 R |
| 3,401,479 A * | 9/1968 | Keyes | ............. | A01K 97/12 43/16 |
| 3,500,570 A * | 3/1970 | Hubbard | ............. | A01K 87/00 43/18.1 R |
| 3,975,855 A * | 8/1976 | McKeown | ............. | A01K 87/08 43/23 |
| 4,020,579 A * | 5/1977 | Snider | ............. | A01K 97/12 43/17 |
| 4,024,666 A * | 5/1977 | Carver | ............. | A01K 87/00 43/18.1 R |
| 4,121,369 A * | 10/1978 | Lopez | ............. | A01K 87/002 43/18.1 R |
| 4,151,672 A * | 5/1979 | Lopez | ............. | A01K 87/002 43/18.1 R |
| 4,300,303 A * | 11/1981 | Hutson | ............. | A01K 87/00 43/24 |
| 4,793,087 A * | 12/1988 | McGee | ............. | A01K 87/08 43/22 |
| 5,564,214 A | 10/1996 | Tsurufuji | | |
| 5,598,657 A | 2/1997 | Akiba et al. | | |
| 5,832,653 A | 11/1998 | Tsurufuji | | |
| 6,125,573 A * | 10/2000 | Wilczynski | ............. | A01K 97/12 43/17 |
| 6,243,981 B1 | 6/2001 | Komura et al. | | |
| 6,339,896 B1 | 1/2002 | Akiba | | |

(Continued)

OTHER PUBLICATIONS

Daiwa Interline Seapower 73 50-350 Saltwater fishing Rod New From Japan F/S. Product Listing [online]. Copyright © 1995-2020 <URL: https://www.ebay.com/p/2094222719?iid=122254143746>. (Year: 1995).*

(Continued)

*Primary Examiner* — Darren W Ark
*Assistant Examiner* — Katelyn T Truong
(74) *Attorney, Agent, or Firm* — Cramer Patent & Design, PLLC; Aaron R. Cramer

(57) ABSTRACT

A fishing rod has a hollow interior in which is secured a semi-rigid line. The semi-rigid line is secured to a durable rubber band which in turn is secured to an interior base of the fishing rod, adjacent the handle. The opposite end of the semi-rigid line comprises a braided portion having a plastic anchor. A strike on the fishing line is thus transmitted through the fishing rod directly to the handle thereof.

11 Claims, 2 Drawing Sheets

(56) References Cited

U.S. PATENT DOCUMENTS

| | | | | |
|---|---|---|---|---|
| 6,361,451 | B1* | 3/2002 | Masters | A63B 53/00 |
| | | | | 473/318 |
| 6,394,909 | B1* | 5/2002 | Laibangyang | A63B 60/16 |
| | | | | 473/232 |
| 2009/0293339 | A1* | 12/2009 | Bartholomew | A63B 59/20 |
| | | | | 43/18.1 R |
| 2012/0011761 | A1* | 1/2012 | Al-Mutairi | A01K 87/007 |
| | | | | 43/19 |

OTHER PUBLICATIONS

Steelpower® Blue Inline. Product Listing [online]. www.gofishing.gb [retrieved on Aug. 18, 2020]. Retrieved from the Internet: <URL: https://gofishing.bg/gr/product/2489/steelpower-blue-inline.html>.

Sealine X-Treme Travel Interline Series. Product Listing [online]. Daiwa [retrieved on Dec. 31, 2019]. Retrieved from the Internet: <URL: https://www.daiwa.com/us/contents/rods/sealinext/index.html>.

Cormoran Seacor Halibut HDC Traveller Interline, 2,35m, 7,71ft, 200-600g, 4 parts, Inline travel boat rod, 29-1600234. Product Listing [online]. © 2019 Fishernator.de [retrieved on Dec. 31, 2019]. Retrieved from the Internet: <URL: https://www.fishernator.com/29-1600234-en.html>.

* cited by examiner

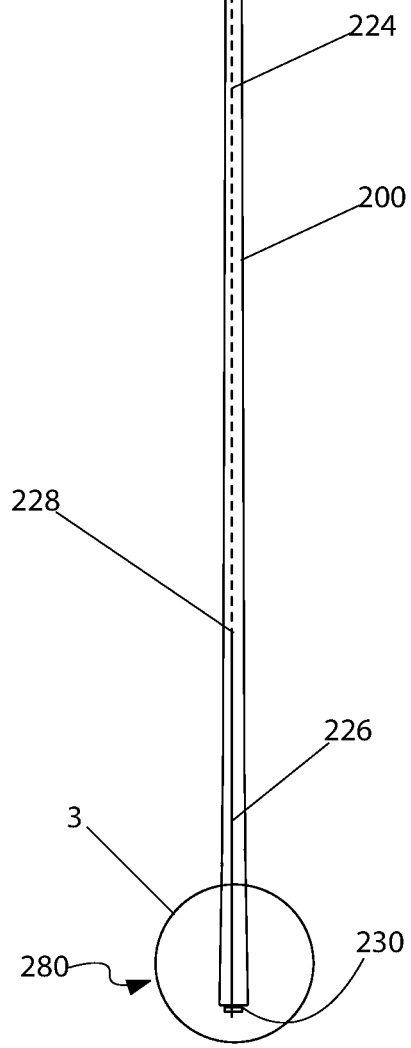
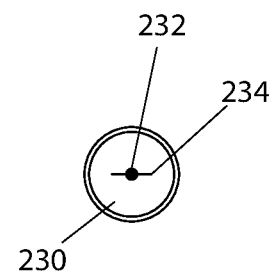
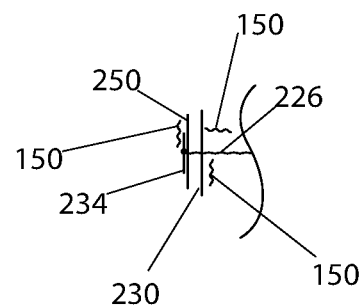
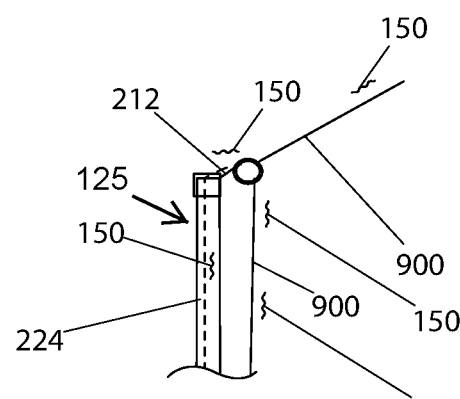
FIG. 2
FIG. 3a
FIG. 3b
FIG. 4

FISHING ROD WITH INTERIOR LINE

RELATED APPLICATIONS

None.

FIELD OF THE INVENTION

The presently disclosed subject matter is directed to a fishing rod and more specifically to a fishing rod with an interior line.

BACKGROUND OF THE INVENTION

In this day and age fishing has become an increasingly complicated endeavor with anglers constantly search for improved methods to catch fish. While in days long gone, all that was needed to go fishing was a stick, string, a hook and a worm, today's fishermen rely on increasingly complicated gear, tackle, and bait.

And yet, regardless of the technology utilized one aspect of fishing that has yet to change is waiting for a fish to strike thereby signaling the strike to the fishing pole by way of motion and/or vibration. While there are technologies which are capable of indicating a strike by use of a light or alarm in communication with the pole and string—these technologies often prove cumbersome for the fisherman wishing to keep things simple. Therefore, there is a need for an improved alerting means to a fishing rod that efficiently signals to the fisherman a given fish strike. The fishing rod with an interior line provides such improvement in a manner which is both simple and effective.

SUMMARY OF THE INVENTION

The principles of the present invention provide for a fishing rod vibration magnifier comprises a fishing rod which has a plurality of line guides and a handle, a vibration magnifier which includes a vibration transmission line, a vibration disk, and an anchor. The vibration magnifier conveys vibration from a tip top which is located at a first end of the fishing rod to the vibration disk located at a second end of the fishing rod. The fishing rod vibration magnifier also comprises a reel which is coupled to a side of the fishing rod and a fishing line which is wound onto and deployed from the reel. The fishing line passes from the reel through the line guides and into a body of water.

The fishing rod may be a semi-rigid straight pole. The vibration transmission line may pass through a hollow interior of the fishing rod and through the vibration disk. The vibration transmission line may include a braided line and an elastic cord. The second end of the braided line may couple to the first end of the elastic cord at a cord joint within the hollow interior of the fishing rod. The elastic cord may pass through the vibration disk aperture and the first end of the elastic cord to couple to the anchor.

A first end of the braided line may be coupled to the first end of the fishing rod. The braided line may be cemented to the first end of the fishing rod. The braided line may be compressed between the tip top and the fishing rod where the tip top couples to the fishing rod. The braided line may be lashed to the tip top. The vibration present at the tip top may be due to movement of the fishing line that travels through the vibration transmission line and may result in movement of the vibration disk to convey an indication of a fish strike. The vibration may result from movement of the fishing line when a fish strikes a submerged end of the fishing line. The fishing line may pass from the reel, through the line guides, and into the body of water. The vibration may be dampened by the fishing rod such that a fisherman does not detect the vibration through the handle of the fishing rod without the vibration magnifier. The vibration disk may produce an audible noise during the vibration. The reel may couple to the fishing rod via a reel seat.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a cross-sectional view of a fishing rod across 2-2 in FIG. 1, according to an embodiment of the present invention;

FIG. 3a is a detail proximal-end view of the proximal end of the fishing rod, according to an embodiment of the present invention, illustrating the vibration disk;

FIG. 3b is a detail side view of the proximal end of the fishing rod, according to an embodiment of the present invention, illustrating the vibration disk; and, FIG. 4 is a detail side view of the distal end of the fishing rod, according to an embodiment of the present invention, illustration the coupling of the braided line to the tip top.

Figure 1:
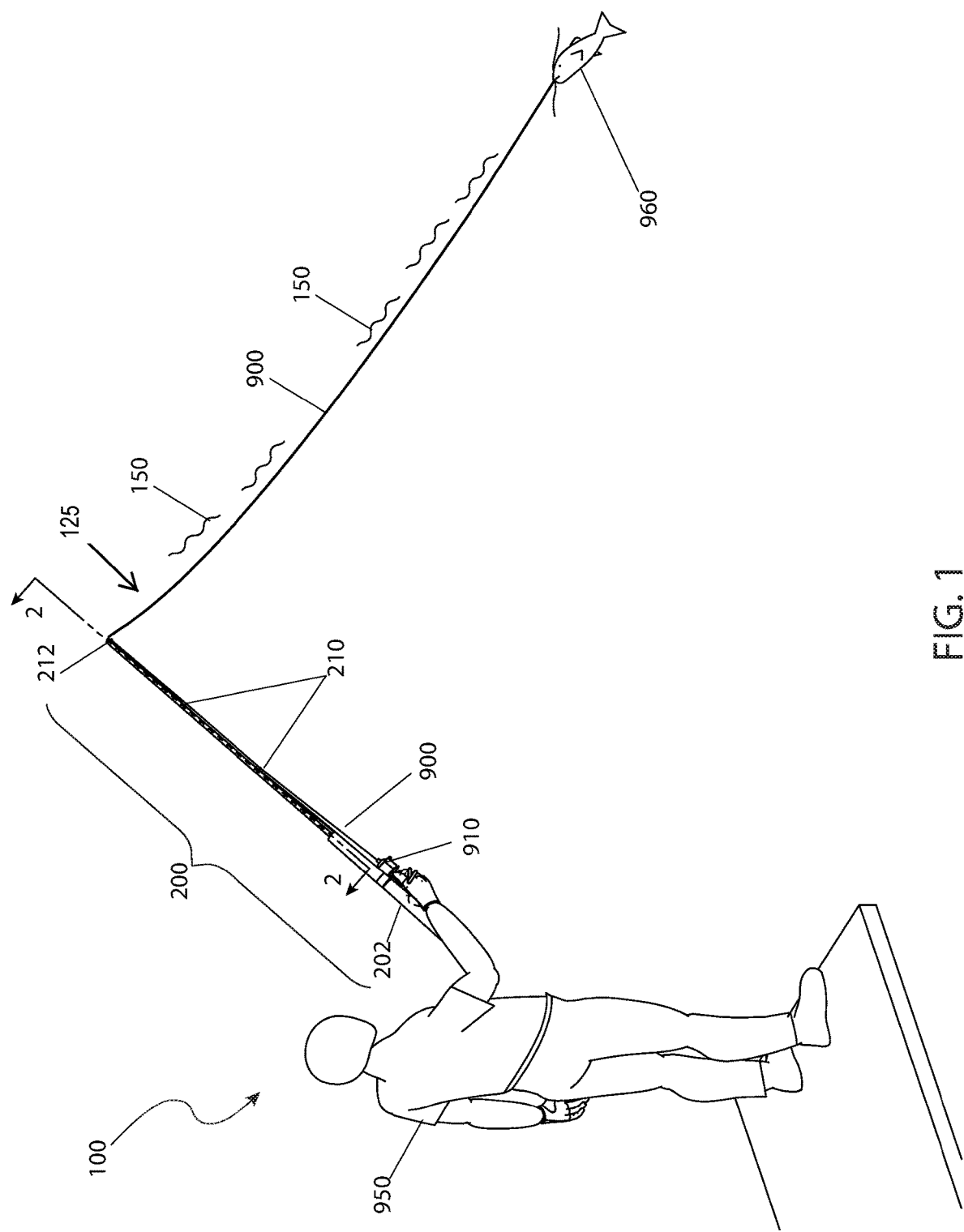
FIG. 1 is an in-use view of a vibration magnifier, according to an embodiment of the present invention.

DESCRIPTIVE KEY 100 fishing rod vibration magnifier
125 vibration magnifier
150 vibration
200 fishing rod
202 handle
210 line guide
212 tip top
224 braided line
226 elastic cord
228 cord joint
230 vibration disk
232 vibration disk aperture
234 anchor
250 auxiliary vibration disk
270 distal end
280 proximal end
900 fishing line
910 reel
950 fisherman
960 fish

DESCRIPTION OF THE INVENTION

The present invention is directed to a fishing rod vibration magnifier 100. The fishing rod vibration magnifier (hereinafter, the "invention") 100 may comprise a fishing rod 200 and a vibration magnifier 125. The vibration magnifier 125 may convey vibration 150 from a tip top 212 located at a distal end 270 of the fishing rod 200 to a vibration disk 230 located at a proximal end 280 of the fishing rod 200. The vibration 150 may result from movement of a fishing line 900 when a fish 960 strikes a submerged end of the fishing line 900. Without the vibration magnifier 125, the vibration 150 may be dampened by the fishing rod 200 such that a fisherman 950 may not detect the vibration 150 through a handle 202 of the fishing rod 200. In some embodiments, the vibration disk 230 may produce an audible noise during the vibration 150.

As shown in FIG. 1, the fishing rod 200 may be a semi-rigid straight pole comprising a plurality of line guides 210 and the handle 202. A reel 910 may be coupled to the side of the fishing rod 200 and the fishing line 900 may be wound onto and deployed from the reel 910. As a non-limiting example, the reel 910 may couple to the fishing rod 200 via a reel seat. The fishing line 900 may pass from the reel 910, through the plurality of line guides 210, and into the water. The tip top 212 may be the topmost of the plurality of line guides 210, coupled to the distal end 270 of the fishing rod 200.

The submerged end of the fishing line 900 may be coupled to hooks, bait, sinkers, bobbers, lures, swivels, or combinations thereof. The fishing line 900 may be pulled when the fish 960 strikes at the submerged end of the fishing line 900. The fishing line 900 may in turn pull on the tip top 212, causing the fishing rod 200 to flex and vibrate to create a vibration 150 in response to the fish strike.

Referring now to FIG. 2, the vibration magnifier 125 may comprise a vibration transmission line, the vibration disk 230, and an anchor 234. The vibration transmission line may pass through a hollow interior of the fishing rod 200 and through the vibration disk 230. The vibration 150 present at the tip top 212 due to movement of the fishing line 900 may travel through the vibration transmission line and may result in movement of the vibration disk 230. Movement of the vibration disk 230 may convey an indication of the fish strike.

The vibration transmission line may comprise a braided line 224 and an elastic cord 226. The braided line 224 may be stronger and less prone to stretching than a monofilament line. The distal end 270 of the braided line 224 may be coupled to the distal end 270 of the fishing rod 200. As non-limiting examples, the braided line 224 may be cemented to the distal end 270 of the fishing rod 200, the braided line 224 may be compressed between the tip top 212 and the fishing rod 200 where the tip top 212 couples to the fishing rod 200, or the braided line 224 may be lashed to the tip top 212 as shown in FIG. 4.

The proximal end 280 of the braided line 224 may couple to the distal end 270 of the elastic cord 226 at a cord joint 228 within the hollow interior of the fishing rod 200. As non-limiting examples, the coupling between the braided line 224 and the elastic cord 226 may result from tying, cementing, clipping, fusing, or combinations thereof.

The elastic cord 226 may pass through a vibration disk aperture 232 and the proximal end 280 of the elastic cord 226 may couple to the anchor 234. See FIG. 3a and FIG. 3b. The anchor 234 may be larger than the diameter of the vibration disk aperture 232 such that the anchor 234 prevents the elastic cord 226 from pulling through the vibration disk 230. As non-limiting examples, the anchor 234 may be a pin or a bead. As non-limiting examples, the proximal end 280 of the elastic cord 226 may couple to the anchor 234 by tying, cementing, clipping, fusing, or combinations thereof.

The vibration disk 230 may be held in contact with the proximal end 280 of the fishing rod 200 by tension from the elastic cord 226 pulling on the anchor 234. As the fishing line 900 is pulled and released by the fish 960, the braided line 224 may tug on the elastic cord 226, causing the elastic cord 226 to stretch and retract. Variations in tension of the elastic cord 226 may cause the vibration disk 230 to make intermittent contact with the fishing rod 200 when the vibration 150 from the fish strike is present. The vibration disk 230 may quiver when the vibration 150 from the fish strike is present. The fisherman 950 may sense the movement of the vibration disk 230. In some embodiments, movement of the vibration disk 230 may resonate or otherwise cause the audible noise which may be heard by the fisherman 950.

In some embodiments, the vibration magnifier 125 may comprise an auxiliary vibration disk 250. The auxiliary vibration disk 250 may be adjacent to the vibration disk 230. The elastic cord 226 may pass through an auxiliary vibration disk aperture in the auxiliary vibration disk 250 before coupling to the anchor 234. The auxiliary vibration disk 250 may strike the vibration disk 230 during the fish strike such that additional movement and/or noise is produced.

In use, the fishing line 900 may be threaded from the reel 910 through the plurality of line guides 210. One (1) or more hooks, bait, lures, sinkers, swivels, bobbers, or combinations thereof may be coupled to the free end of the fishing line 900. The fishing rod 200 may be used to cast the fishing line 900 over the water such that the submerged end of the fishing line 900 is accessible to the fish. When the fish 960 strikes the submerged end of the fishing line 900, the fish 960 may struggle while pulling the fishing line 900 which in turn may pull and release the tip top 212, causing vibration 150 within the fishing rod 200 as the fishing rod 200 flexes and straightens repeatedly. Repeated flexing of the fishing rod 200 may be conveyed through the fishing rod 200 by the vibration transmission line. Upon reaching the vibration disk 230, the vibration 150 may cause the vibration disk 230 to movement and/or noise that alerts the fisherman 950 to the strike.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A fishing rod vibration magnifier, comprising:
   a fishing rod having a plurality of line guides and a handle;
   a vibration magnifier including a vibration transmission line, a vibration disk, and an anchor, the vibration magnifier conveys vibration from a tip top located at a first end of the fishing rod to the vibration disk located at a second end of the fishing rod;
   a reel coupled to a side of the fishing rod and a fishing line is wound onto and deployed from the reel, the fishing line passes from the reel through the line guides and into a body of water; and
   an auxiliary vibration disk attached to the fishing line and disposed adjacent to the vibration disk, the auxiliary vibration disk strikes the vibration disk during a fish strike such that additional movement and/or noise is produced;
   wherein the vibration transmission line passes through a hollow interior of the fishing rod and through the vibration disk;
   wherein the vibration transmission line includes a braided line secured to an elastic cord;

wherein the elastic cord passes through a vibration disk aperture of the vibration disk and a first end of the elastic cord to couple to the anchor; and wherein a first end of the braided line is coupled to the first end of the fishing rod.

2. The fishing rod vibration magnifier according to claim 1, wherein the fishing rod is a semi-rigid straight pole.

3. The fishing rod vibration magnifier according to claim 1, wherein a second end of the braided line couples to a second end of the elastic cord at a cord joint within the hollow interior of the fishing rod.

4. The fishing rod vibration magnifier according to claim 1, wherein the first end of the braided line is cemented to a first end of the fishing rod.

5. The fishing rod vibration magnifier according to claim 1, wherein the first end of the braided line is lashed to the tip top.

6. The fishing rod vibration magnifier according to claim 1, wherein vibration present at the tip top is due to movement of the fishing line that travels through the vibration transmission line and results in movement of the vibration disk to convey an indication of the fish strike.

7. The fishing rod vibration magnifier according to claim 1, wherein the vibration results from movement of the fishing line when the fish strikes a submerged end of the fishing line.

8. The fishing rod vibration magnifier according to claim 1, wherein the fishing line passes from the reel, through the line guides, and into the body of water.

9. The fishing rod vibration magnifier according to claim 1, wherein the vibration is dampened by the fishing rod such that a fisherman does not detect the vibration through the handle of the fishing rod without the vibration magnifier.

10. The fishing rod vibration magnifier according to claim 1, wherein the vibration disk produces an audible noise during the vibration.

11. The fishing rod vibration magnifier according to claim 1, wherein the reel couples to the fishing rod via a reel seat.

* * * * *